(12) United States Patent
Arndt Dr habil et al.

(10) Patent No.: US 10,976,435 B2
(45) Date of Patent: Apr. 13, 2021

(54) ACTIVE PARKING ASSIST SYSTEM FOR A MOTOR VEHICLE

(71) Applicant: Ford Global Technologies, LLC, Dearborn, MI (US)

(72) Inventors: Christoph Arndt Dr habil, Moerlen (DE); Uwe Gussen, Huertgenwald (DE); Frederic Stefan, Aachen (DE); Frank Petri, Erftstadt (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/557,596

(22) Filed: Aug. 30, 2019

(65) Prior Publication Data

US 2020/0072976 A1    Mar. 5, 2020

(30) Foreign Application Priority Data

Aug. 30, 2018    (DE) .......................... 102018214730.2

(51) Int. Cl.
| | |
|---|---|
| *G01S 15/93* | (2020.01) |
| *G01S 15/931* | (2020.01) |
| *B60W 30/06* | (2006.01) |
| *G08G 1/16* | (2006.01) |
| *B62D 15/02* | (2006.01) |

(52) U.S. Cl.
CPC .......... *G01S 15/931* (2013.01); *B60W 30/06* (2013.01); *B62D 15/0285* (2013.01); *G08G 1/168* (2013.01); *G01S 2015/932* (2013.01); *G01S 2015/937* (2013.01)

(58) Field of Classification Search
CPC ............. G01S 15/931; G01S 2015/932; G01S 2015/937; B60W 30/06; B62D 15/0285; G08G 1/168
USPC ......................................................... 340/943
See application file for complete search history.

(56) References Cited

U.S. PATENT DOCUMENTS

| | | | | |
|---|---|---|---|---|
| 5,754,123 | A * | 5/1998 | Nashif | G01S 15/86 340/903 |
| 10,384,718 | B1 * | 8/2019 | Kentley-Klay | G06N 20/00 |
| 2007/0279199 | A1 * | 12/2007 | Danz | G08G 1/168 340/435 |
| 2012/0166058 | A1 * | 6/2012 | Armbrust | B60W 30/0956 701/96 |
| 2014/0288814 | A1 * | 9/2014 | Schoenherr | G01S 15/931 701/301 |
| 2015/0012176 | A1 * | 1/2015 | Schindler | B60R 25/2054 701/36 |
| 2015/0290678 | A1 * | 10/2015 | Chowdhury | B06B 1/0292 438/51 |
| 2017/0203757 | A1 * | 7/2017 | Ohbayashi | B62D 15/027 |
| 2017/0274876 | A1 * | 9/2017 | Kim | B60W 30/0953 |
| 2017/0329008 | A1 * | 11/2017 | Walessa | G01S 17/86 |
| 2019/0056495 | A1 * | 2/2019 | Bariant | G01S 7/54 |
| 2019/0066396 | A1 * | 2/2019 | Jiang | G01S 13/931 |
| 2020/0072976 | A1 * | 3/2020 | Arndt Dr habil | G01S 15/931 |

* cited by examiner

*Primary Examiner* — Omar Casillashernandez
(74) *Attorney, Agent, or Firm* — Frank Lollo; Eversheds Sutherland (US) LLP

(57) ABSTRACT

The invention relates to an active parking assist system (4) for a motor vehicle (2), wherein the parking assist system (4) comprises a plurality of capacitive ultrasonic converters (6a, 6b, 6c, 6d, 6e, 6f, 6g, 6h, 6i, 6j, 6k, 6l, 6m, 6n, 6o) which are essentially spaced evenly in a horizontally circumferential manner outside the motor vehicle (2).

10 Claims, 1 Drawing Sheet

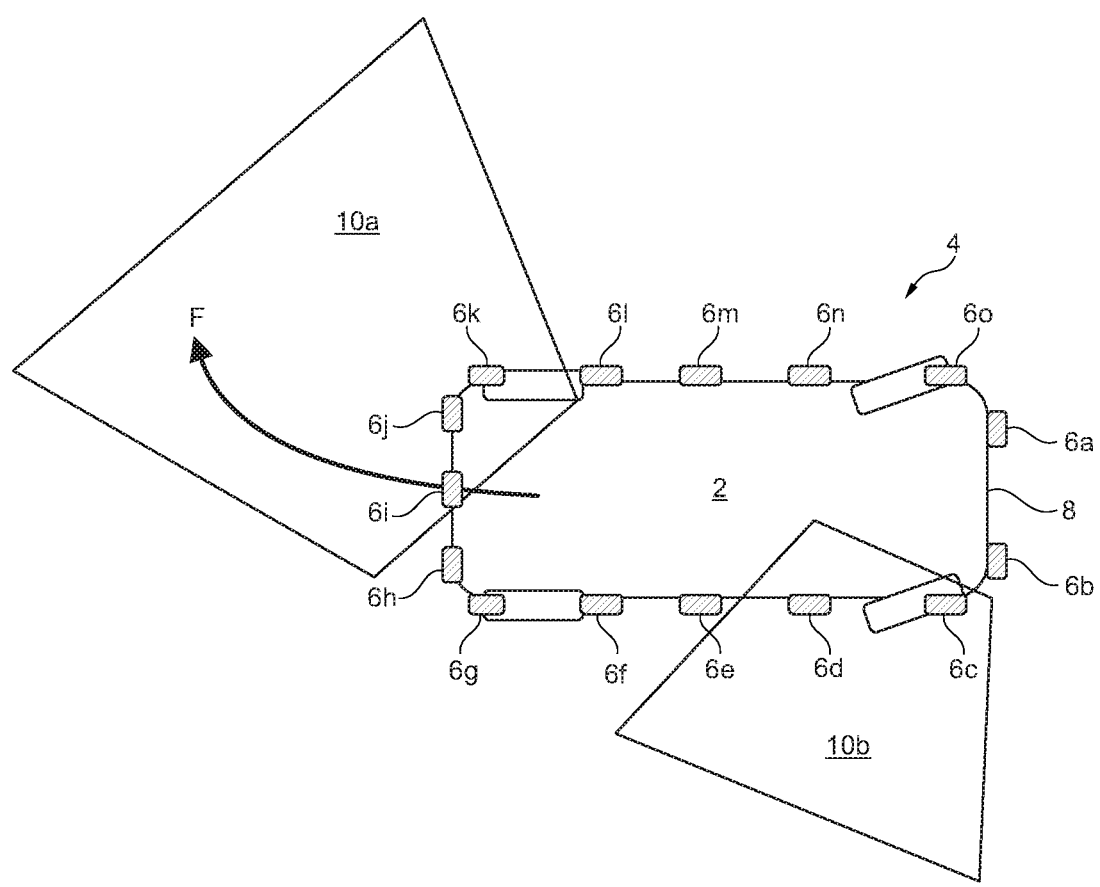

* # ACTIVE PARKING ASSIST SYSTEM FOR A MOTOR VEHICLE

CROSS-REFERENCE TO RELATED APPLICATIONS

This application claims priority to and the benefit of German patent application No. 102018214730.2, filed Aug. 30, 2018, which is hereby incorporated by reference herein in its entirety.

The invention relates to an active parking assist system for a motor vehicle.

Parking assist systems are devices or systems which are intended to facilitate the parking of a motor vehicle, particularly in a tight space.

During operation, a detected distance from an object in the surroundings of the motor vehicle is indicated to the driver either purely acoustically, or visually and acoustically, depending on the manufacturer and the scope. The purely acoustic version signals the distance via warning tones which occur ever more rapidly until they become a continuous tone. Visual-acoustic systems initially indicate the approach toward an object visually via LED displays or a diagram on the screen, and in the case of a very short distance (approximately 30 cm or less), additionally provide an acoustic warning of the "hazard" by means of rapid warning tones which become a continuous warning tone.

Such active parking assist systems comprise ultrasonic converters or radar systems.

The piezoelectric ultrasonic converters are integrated into bumpers of the motor vehicle. A distinction is made between two-channel, four-channel, and six-channel systems, meaning that two, four, or six round sensors, which are usually painted in the color of the vehicle, are integrated into each bumper. The ultrasonic converters transmit and receive ultrasonic signals and transmit the obtained data to a control unit, which then determines the distance from the sensor to the obstacle from the propagation time of the ultrasonic signal.

A parking assist system based on radar is identical to the ultrasonic design; however, radar signals are evaluated. A disadvantage becomes apparent in heavy rain, as the radar sensors may occasionally also emit a warning due to water running off the bumper.

In addition, so-called surround-view systems exist which generate an image from the aerial perspective, i.e., viewing the motor vehicle from above. For this purpose, in addition to a reversing camera, additional wide-angle cameras are situated on the front and under the two external mirrors. For this purpose, all images are equalized and displayed on a monitor in the cockpit. However, this requires the provision of high computing capacity, in particular when tracking objects and detecting free spaces.

Thus, active parking assist systems have advantages over passive surround-view systems with respect to object tracking and distance determination. However, active parking assist systems monitor only the area in front of and behind the motor vehicle.

Thus, there is a need to demonstrate ways in which such an active parking assist system for a motor vehicle can be improved.

The object of the present invention is achieved via an active parking assist system for a motor vehicle, wherein the parking assist system comprises a plurality of capacitive ultrasonic converters which are essentially spaced evenly in a horizontally circumferential manner outside the motor vehicle.

"Essentially spaced evenly apart from one another" may be understood to mean that the sections covered by directly adjacent ultrasonic converters at least partially overlap. Correspondingly, in corner regions of the motor vehicle, the respective distances between directly adjacent capacitive ultrasonic converters are less than the distances between capacitive ultrasonic converters on the sides of the motor vehicle.

Such capacitive ultrasonic converters comprise a diaphragm which can be electrostatically displaced. Thus, ultrasonic pulses may be produced by applying a voltage. If, however, ultrasonic sound strikes the diaphragm, this causes a displacement of the diaphragm, resulting in a change in an electrical capacitance of a capacitor arrangement which is made up of the diaphragm and a counterelectrode. This change in the electrical capacitance can be detected using a measurement technique and evaluated.

According to one embodiment, the capacitive ultrasonic converter is configured as microsystems. A microsystem may be understood to mean a component of which the component parts have smallest measurements in the range of one micrometer and interact as a system. Generally, a microsystem is made up of one or several sensors, actuators, and control electronics on a substrate or chip. The dimensions of the individual components vary within the range of a few micrometers. A distinction is to be made with nanosystems, which are an order of magnitude smaller. Such capacitive ultrasonic converters configured as a microsystem are economical and can be manufactured in large quantities, have low power consumption, can be well integrated into the outward appearance of a motor vehicle so that they are hardly visible or are invisible, and provide high accuracy and large bandwidth, as well as a low signal-to-noise ratio or a low noise margin.

According to an additional embodiment, the capacitive ultrasonic converters are configured for beamforming. Beamforming may be understood to mean a method for determining the position of objects in sound fields. Corresponding devices are also referred to as acoustic cameras, microphone arrays, or acoustic antennas. The measuring principle is based on the fact that a microphone array is focused onto the various measurement points. This takes place via a time shift of the signals detected by the respective microphone which corresponds to the propagation time from the measuring point to this microphone. The time-corrected signals of all microphones are summed, whereby a time signal results which is associated with the respective measuring point. The sound from objects at other positions is thus attenuated, since the signals thereof are no longer completely time-corrected and partially overlap destructively. On the other hand, the sound emitted from the respective measuring point (focus point) is amplified.

According to another embodiment, the capacitive ultrasonic converters are arranged on a decorative element encircling the motor vehicle. The decorative element may have a purely decorative function in order to give the motor vehicle a visually appealing exterior. However, alternatively or in addition, the decorative element may also be configured as a bumper or fender.

According to another embodiment, supply and/or signal lines are associated with the decorative element. For example, the interior of the decorative element may comprise one or several channels in which supply and/or signal lines are accommodated, which supply the ultrasonic converters with operating power and which transmit measured values to a control unit of the active parking assist system.

The signal lines may also be part of a bus system, so that no individual lines are required for each of the ultrasonic converters.

Furthermore, the invention comprises a motor vehicle having such an active parking assist system.

The invention will now be described with the aid of a drawing. The following is depicted:

FIG. 1 depicts a schematic representation of a motor vehicle comprising an active parking assist system.

A scenario is depicted in which a motor vehicle 2, in the present exemplary embodiment, a passenger vehicle, is moved backward in the direction of travel F in order, for example, to park the motor vehicle 2.

The motor vehicle 2 comprises an active parking assist system 4 which, in the scenario depicted in FIG. 1, monitors a rear area 10a and a side area 10b with respect to objects with which the motor vehicle 2 could collide.

For this purpose, the active parking assist system 4 comprises a plurality of capacitive ultrasonic converters 6a, 6b, 6c, 6d, 6e, 6f, 6g, 6h, 6i, 6j, 6k, 6l, 6m, 6n, 6o.

The capacitive ultrasonic converters 6a, 6b, 6c, 6d, 6e, 6f, 6g, 6h, 6i, 6j, 6k, 6l, 6m, 6n, 6o are arranged on the front side and the rear side, as well as on the sides of the motor vehicle 2.

In the present exemplary embodiment, there are 15 capacitive ultrasonic converters 6a, 6b, 6c, 6d, 6e, 6f, 6g, 6h, 6i, 6j, 6k, 6l, 6m, 6n, 6o, of which two capacitive ultrasonic converters 6a, 6b are arranged on the front side, three capacitive ultrasonic converters 6h, 6i, 6j are arranged on the rear side, and five capacitive ultrasonic converters 6c, 6d, 6e, 6f, 6g, 6k, 6l, 6m, 6n, 6o are arranged on each of the two sides of the motor vehicle 2. Deviating from the present exemplary embodiment, there may be a different number of capacitive ultrasonic converters. Likewise, the capacitive ultrasonic converters may also be distributed differently on the front side, rear side, and the two sides of the motor vehicle 2.

Thus, they run once about the vertical axis of the motor vehicle 2, or rather, encircle the motor vehicle horizontally. In this case, the capacitive ultrasonic converters 6a, 6b, 6c, 6d, 6e, 6f, 6g, 6h, 6i, 6j, 6k, 6l, 6m, 6n, 6o are essentially spaced evenly apart from one another. "Essentially spaced evenly apart from one another" may be understood to mean that the sections of the respective areas 10a, 10b covered by directly adjacent ultrasonic converters 6a, 6b, 6c, 6d, 6e, 6f, 6g, 6h, 6i, 6j, 6k, 6l, 6m, 6n, 6o at least partially overlap. Correspondingly, in corner areas of the motor vehicle 2, the respective distances between directly adjacent capacitive ultrasonic converters 6a, 6b, 6c, 6d, 6e, 6f, 6g, 6h, 6i, 6j, 6k, 6l, 6m, 6n, 6o are less than the distances between capacitive ultrasonic converters 6a, 6b, 6c, 6d, 6e, 6f, 6g, 6h, 6i, 6j, 6k, 6l, 6m, 6n, 6o on the sides of the motor vehicle 2.

The capacitive ultrasonic converters 6a, 6b, 6c, 6d, 6e, 6f, 6g, 6h, 6i, 6j, 6k, 6l, 6m, 6n, 6o are configured as a microsystem or as CMUTs (capacitive micromachined ultrasonic transducers).

The main components of such capacitive ultrasonic converters 6a, 6b, 6c, 6d, 6e, 6f, 6g, 6h, 6i, 6j, 6k, 6l, 6m, 6n, 6o are a cavity, a diaphragm, and a counterelectrode.

The diaphragm and the counterelectrode are biased by means of the application of a DC voltage, and are controlled via an additional AC current signal in order to move the diaphragm harmonically.

Using manufacturing methods, for example, surface micromachining, bulk micromachining, or wafer bonding, a capacitor arrangement is formed, wherein the diaphragm has, for example, a metallic coating, and the counterelectrode is formed via a highly doped silicon substrate. In addition, an electrically insulating layer may be provided. A chip may comprise a plurality of converter elements which form an array. In this case, each capacitive ultrasonic converter 6a, 6b, 6c, 6d, 6e, 6f, 6g, 6h, 6i, 6j, 6k, 6l, 6m, 6n, 6o respectively comprises a plurality of converter elements, each having a cavity, a diaphragm, and a counterelectrode.

In the present exemplary embodiment, the capacitive ultrasonic converters 6a, 6b, 6c, 6d, 6e, 6f, 6g, 6h, 6i, 6j, 6k, 6l, 6m, 6n, 6o are arranged on a decorative element 8 encircling the motor vehicle 2. The decorative element 8 is configured as a bumper or fender. Deviating from the present exemplary embodiment, the decorative element 8 may, however, only have the function of providing the motor vehicle 2 with a visually appealing exterior.

Furthermore, in the present exemplary embodiment, the interior of the decorative element 8 comprises one or several channels in which supply and/or signal lines are accommodated, which supply the capacitive ultrasonic converters 6a, 6b, 6c, 6d, 6e, 6f, 6g, 6h, 6i, 6j, 6k, 6l, 6m, 6n, 6o with operating power and which transmit measured values to a control unit of the active parking assist system.

During operation, the capacitive ultrasonic converters 6a, 6b, 6c, 6d, 6e, 6f, 6g, 6h, 6i, 6j, 6k, 6l, 6m, 6n, 6o are controlled by the control unit in such a way that beamforming operation occurs.

In this case, the individual capacitive ultrasonic converters 6a, 6b, 6c, 6d, 6e, 6f, 6g, 6h, 6i, 6j, 6k, 6l, 6m, 6n, 6o receive a large range of reflection signals from objects. The control unit then determines the respective distances and directions. For this purpose, the control unit may employ algorithms such as PCA (principal component analysis), LDA (discriminant function), MUSIC (multiple signal classification), or ESPRIT (eigenvalue estimation).

A detected distance from an object in the surroundings of the motor vehicle 2 may then be indicated either purely acoustically, or visually and acoustically.

Thus, such an active parking assist system 4 may be improved by means of the warning of a plurality of capacitive ultrasonic converters 6a, 6b, 6c, 6d, 6e, 6f, 6g, 6h, 6i, 6j, 6k, 6l, 6m, 6n, 6o.

LIST OF REFERENCE CHARACTERS

2 Motor vehicle
4 Parking assist system
6a Ultrasonic converter
6b Ultrasonic converter
6c Ultrasonic converter
6d Ultrasonic converter
6e Ultrasonic converter
6f Ultrasonic converter
6g Ultrasonic converter
6h Ultrasonic converter
6i Ultrasonic converter
6j Ultrasonic converter
6k Ultrasonic converter
6l Ultrasonic converter
6m Ultrasonic converter
6n Ultrasonic converter
6o Ultrasonic converter
8 Decorative element
10a Area
10b Area
F Direction of travel

The invention claimed is:

1. An active parking assist system (4) for a motor vehicle (2), the active parking assist system (4) comprising:
a plurality of capacitive ultrasonic converters (6 *a*, 6 *b*, 6 *c*, 6 *d*, 6 *e*, 6 *f*, 6 *g*, 6 *h*, 6 *i*, 6 *j*, 6 *k*, 6 *l*, 6 *m*, 6 *n*, 6 *o*),
wherein the plurality of capacitive ultrasonic converters are essentially spaced evenly in a horizontally circumferential manner outside the motor vehicle (2), and
wherein sections covered by any two directly adjacent capacitive ultrasonic converters of the plurality of capacitive ultrasonic converters at least partially overlap, wherein respective distances between two directly adjacent capacitive ultrasonic converters of the plurality of capacitive ultrasonic converters in each of corner region of the motor vehicle are less than distances between any two directly adjacent capacitive ultrasonic converters of the plurality of capacitive ultrasonic converters on sides of the motor vehicle, wherein the sides of the motor vehicle comprises a front side and a rear side of the motor vehicle.

2. The active parking assist system (4) according to claim 1, wherein the plurality of capacitive ultrasonic converters (6 *a*, 6 *b*, 6 *c*, 6 *d*, 6 *e*, 6 *f*, 6 *g*, 6 *h*, 6 *i*, 6 *j*, 6 *k*, 6 *l*, 6 *m*, 6 *n*, 6 *o*) are configured as microsystems.

3. The active parking assist system (4) according to claim 1, wherein the plurality of capacitive ultrasonic converters (6 *a*, 6 *b*, 6 *c*, 6 *d*, 6 *e*, 6 *f*, 6 *g*, 6 *h*, 6 *i*, 6 *j*, 6 *k*, 6 *l*, 6 *m*, 6 *n*, 6 *o*) are configured for beamforming.

4. The active parking assist system (4) according to claim 1, wherein the plurality of capacitive ultrasonic converters (6 *a*, 6 *b*, 6 *c*, 6 *d*, 6 *e*, 6 *f*, 6 *g*, 6 *h*, 6 *i*, 6 *j*, 6 *k*, 6 *l*, 6 *m*, 6 *n*, 6 *o*) are arranged on a decorative element (8) encircling the motor vehicle (2).

5. The active parking assist system (4) according to claim 4, wherein supply and/or signal lines are associated with the decorative element (8).

6. A motor vehicle (2), comprising:
an active parking assist system comprising a plurality of capacitive ultrasonic converters,
wherein plurality of capacitive ultrasonic converters are essentially spaced evenly in a horizontally circumferential manner outside the motor vehicle, and
wherein sections covered by any two directly adjacent capacitive ultrasonic converters of the plurality of capacitive ultrasonic converters at least partially overlap, wherein respective distances between two directly adjacent capacitive ultrasonic converters of the plurality of capacitive ultrasonic converters in each of corner region of the motor vehicle are less than distances between any two directly adjacent capacitive ultrasonic converters of the plurality of capacitive ultrasonic converters on sides of the motor vehicle, wherein the sides of the motor vehicle comprises a front side and a rear side of the motor vehicle.

7. The motor vehicle according to claim 6, wherein the plurality of capacitive ultrasonic converters are configured as microsystems.

8. The motor vehicle according to claim 6, wherein the plurality of capacitive ultrasonic converters are configured for beamforming.

9. The motor vehicle according to claim 6, wherein the plurality of capacitive ultrasonic converters (6 *a*, 6 *b*, 6 *c*, 6 *d*, 6 *e*, 6 *f*, 6 *g*, 6 *h*, 6 *i*, 6 *j*, 6 *k*, 6 *l*, 6 *m*, 6 *n*, 6 *o*) are arranged on a decorative element (8) encircling the motor vehicle (2).

10. The motor vehicle according to claim 9, wherein supply and/or signal lines are associated with the decorative element (8).

\* \* \* \* \*